Figure 1:
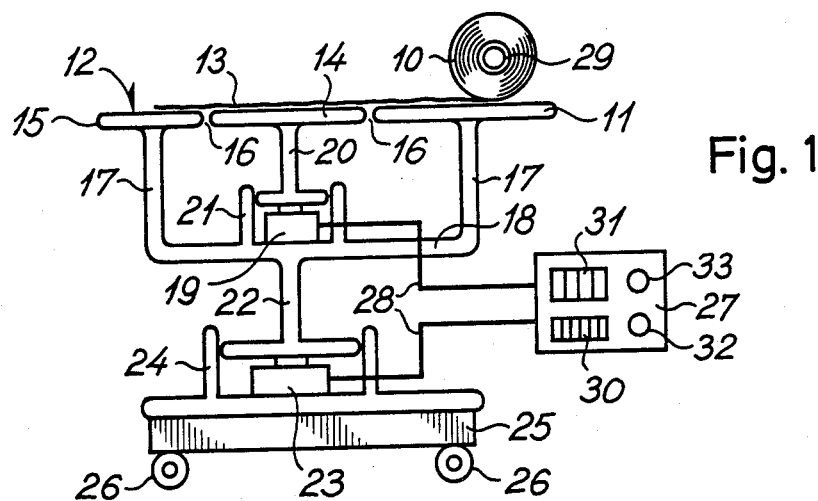

United States Patent [19]

Gregersen et al.

[11] Patent Number: 4,912,972
[45] Date of Patent: Apr. 3, 1990

[54] METHOD AND APPARATUS FOR DETERMINING THE LENGTH OF A FLEXIBLE WEB OR STRING MATERIAL

[75] Inventors: Johan C. Gregersen, Bagsværd; Johan Dovmark, Hellerup, both of Denmark

[73] Assignee: Jens Reumert, London, United Kingdom

[21] Appl. No.: 258,999
[22] PCT Filed: Feb. 12, 1988
[86] PCT No.: PCT/DK88/00020
  § 371 Date: Dec. 8, 1988
  § 102(e) Date: Dec. 8, 1988
[87] PCT Pub. No.: WO88/06272
  PCT Pub. Date: Aug. 25, 1988

[30] Foreign Application Priority Data

Feb. 12, 1987 [DK] Denmark .................... 712/87

[51] Int. Cl.⁴ .................................. G01B 5/02
[52] U.S. Cl. ........................ 73/159; 177/200; 364/562; 364/567; 364/568
[58] Field of Search ............. 73/159; 177/25.14, 200; 364/562, 567, 568, 563, 564

[56] References Cited

U.S. PATENT DOCUMENTS

| | | | |
|---|---|---|---|
| 2,767,974 | 10/1956 | Ballard et al. | 177/200 |
| 3,175,438 | 3/1965 | Johnson | 364/567 |
| 3,190,382 | 6/1965 | Zimmerman | 177/132 |
| 3,216,515 | 11/1965 | Roberts | 364/562 |
| 3,494,437 | 2/1970 | Fathauer | 177/200 |
| 3,712,394 | 1/1973 | Davies et al. | 177/200 |
| 4,512,428 | 4/1985 | Bullivant | 364/568 |

FOREIGN PATENT DOCUMENTS

| | | | |
|---|---|---|---|
| 2220369 | 11/1973 | Fed. Rep. of Germany | 177/200 |
| 1294461 | 10/1972 | United Kingdom. | |
| 2095866 | 10/1982 | United Kingdom. | |

Primary Examiner—William A. Cuchlinski, Jr.
Assistant Examiner—Diego F. F. Gutierrez
Attorney, Agent, or Firm—Merchant, Gould, Smith, Edell, Welter & Schmidt

[57] ABSTRACT

Wherein the length of a flexible web or string material, such as a textile material, forming a wound body or roll (10) may be determined by determining a first measure of the weight of the web or string material, determining a second measure of the weight of a predetermined length (1) of the material, and calculating the total length of the flexible web or string material on the basis of said predetermined length (1) and said first and second weight measures. Thus, a roll (10) of a textile material may be placed on a table (12) divided into sections, of which a first section (11) supports the roll while a second section (14) supports the predetermined length (1) of the material. The second section and the web material arranged thereon may be supported by a weighing cell and the whole table (12) and the web material or textile material arranged thereon may be supported be another weighting cell. Weighing signals from these weighing cells may be supplied to a calculating device (27) for calculating the total length of the web material.

17 Claims, 2 Drawing Sheets

METHOD AND APPARATUS FOR DETERMINING THE LENGTH OF A FLEXIBLE WEB OR STRING MATERIAL

The present invention relates to a method of determining the length of a flexible web or a string material forming a wound body, such as a roll of web or ribbon material, for example a roll of a web or ribbon of textile, plastic film, paper, cardboard, roofing felt, or the like, or a ball, clew or spool of a string material, such as yarn, thread, wire, rope, chain, or the like.

In shops, department stores, factories and other places where such web or string material is sold or consumed it may be desirable currently or at certain time intervals to determine and register the remaining length of the web or string material in each of the wound bodies from which web or string material has been sold or used, in order to accurately control the amount and/or the value of web and/or string material in stock. Up till now, the length of web or string material left in a wound body, such as a roll of textile material, has been estimated for example by measuring the diameter of the roll. However, this known method has proved to give rather inaccurate results.

The present invention provides a method rendering it possible to determine the length of a flexible web or string material wound into a roll, ball, clew or another wound body very accurately.

Thus, the present invention provides a method of determining the length of a flexible web or string material forming a wound body, said method comprising determining a fist measure of the weight of said web or string material, determining a second measure of the weight of a predetermined length of said web or string material, and calculating the total length of the flexible web or string material on the basis of said predetermined length and said first and second weight measures. Assuming that the weight of a length unit of the web or string material is substantially the same along the length of the web material, the total length of the web or string material may be calculated by multiplying said predetermined length by the ratio of said first weight measure and said second weight measure. The weight or weight measure of a predetermined length of web or string material may be determined once for all, for example by the manufacturer of the web or string material, and in order to determine the total length of the wound web or string material, it is then sufficient to determine said first measure of the weight of the string material. As an example, each wound body may be supported by a supporting member, such as a shaft or core, transferring the weight of the wound body to weight determining means which may, for example, comprise weighing cells, strain gages, etc. Each of these weight determining means may then output a weighing signal which may be transmitted to an electrical control system, such as a computer, which also receives or has received information about the weight of said predetermined length of the various web or string materials. The computer or control system may then currently or at certain time intervals determine and register the length of web or string material in each wound body whereby current information about the amount and/or value of each of the various kinds of web or string material is easily available. Because the weight of a length unit of the web or string material may vary substantially during storage, for example dependent on the humidity of the ambient atmosphere, said second weight measure of the predetermined length of web or string material may, alternatively, be determined substantially at the same time as said first weight measure. The predetermined length of material may then be cut from a free end portion of the wound body prior to determining said second weight measure. In the preferred embodiment, said predetermined length is a length of a free end portion of the wound web or string material, said second weight measure being determined while said predetermined length is connected to said wound body. The wound body may then be placed on a specially designed weighing apparatus which may determine said first and second weight measures substantially at the same time and possibly also make the necessary calculation for displaying the desired information about the total length of the web or string material in the wound body. Such weighing apparatuses may, for example, be used in self-service stores where they may be combined with a cutting apparatus and be adapted to automatically register the length cut form the wound body by a customer. The apparatus may also be adapted to print out an invoice and—when the web material is a textile material—to print out information about the textile material and the proper treatment of the same, such as information about proper washing and cleaning.

The wound body may comprise a core member around which the web or string material is wound, and said first weight measure may then be determined by determining or estimating the total weight of the wound body, determining the weight of the core member, and subtracting the weight of the core member from the total weight of the wound body. Information about the weight of the core member is advantageously provided by the manufacturer of the web or string material and may be in the form of a code which may be automatically detected by a weighing apparatus, or the information may be given in plain writing. When not provided by the manufacturer, the weight of the core member may be provided as an empirically determined average value or by determining the specific weight of the material and the volume of the core member. The specific weight of the core member material may, for example, be determined on the basis of a small sample of material taken out from the core member, and the volume of the core member may be calculated on the basis of its dimensions. In case the core member protrudes axially from the wound material, the protruding core member parts may be supported at axially spaced locations, and the weight of the core member may then be calculated on the basis of the relationship of weight fractions supported at the various locations of support.

Said second weight measure may be determined by second weight means supporting said predetermined length, and said first weight measure may be determined by first weighing means supporting said wound body and possibly also said second weighing means. The first and second weight measures may then be determined substantially simultaneously. The weighing means may be any suitable means which are able to provide a value which is a measure of the weight of the wound body and of the predetermined length, respectively, and as mentioned above, such weighing means may comprise weighing cells, strain gages, but also scale devices and any other types of weighing devices. Each of the weighing means may be read by an operator who makes the necessary calculation for determining the total length of the wound web or string material in the manner indicated above. In the preferred embodiment, the weighing means provide suitable signals which are transmitted to a calculating and recording device for calculating and recording the total length of the web or string material. These signals may comprise electrical signals, hydraulic or pneumatic pressure signals, and mechanical movement or pressure signals.

When the second weight measure of the predetermined length of web or string material is determined while said length is connected to the remaining wound web or string material, the weight measure determined may to some extent depend on the flexibility of the web or string material. According to the present invention said second weight measure may be determined by weighing different fractions of said predetermined length separately, and errors depending on the flexibility of the web or string material may then be compensated for on the basis of the relationship of the determined weights of said fractions.

The present invention also provides an apparatus for determining the length of a flexible web or string material forming a wound body, said apparatus comprising first weighing means for supporting said wound body and for determining a first weight measure therefor, second weighing means for supporting a predetermined length of the web or string material and for determining a second weight measure of said predetermined length, and means for calculating the length of the web or string material on the basis of said first and second weight measures.

Said first and second weight measures are preferably in the form of first and second electrical signals which are transmitted to said calculating means which are of the electronic type. The calculating means may be provided for each set of weighing means, or they may be in the form of a central computer receiving weight measure signals from a plurality of apparatuses each adapted to support a body of wound web or string material. The computer may then calculate the length of the wound material of each of the various wound bodies and store the calculated results. Alternatively, signals indicating the total lengths of the wound material of the various wound bodies may be generated at each single apparatus and transmitted to a central electronic storing device.

The second weighing means may be supported by the first weighing means so that the first weighing means may determine the total weight not only of the body of wound web or string material, but also of the predetermined length of a free end portion of the web material which is supported by said second weighing means. The second weighing means may simultaneously determine a weight measure of the predetermined length of web or string material.

In a preferred embodiment of the apparatus, said first and second weighing means comprise first and second supporting surfaces for supporting said wound body and said predetermined length, respectively, said supporting surfaces extending substantially horizontally and in substantially the same plane and being separated by a first narrow gap extending at right angles to the length of the free end portion of the web or string material. The total length of a body of wound web or string material may then be determined by placing the wound body on said first supporting surface so that a free end portion constituting said predetermined length extends along and is supported by said second supporting surface. Due to the narrow separating gap between the supporting surfaces the predetermined length of web material supported by the second supporting surface may be weighed separately.

Figure 2:
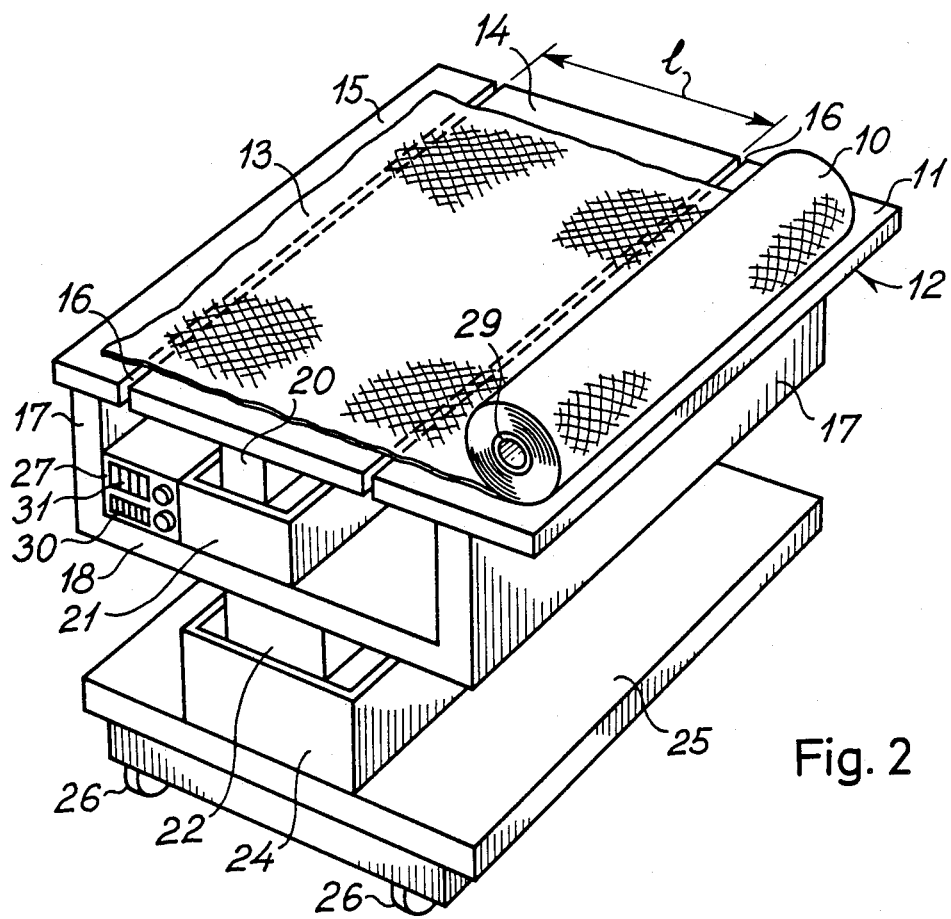
Figure 3:
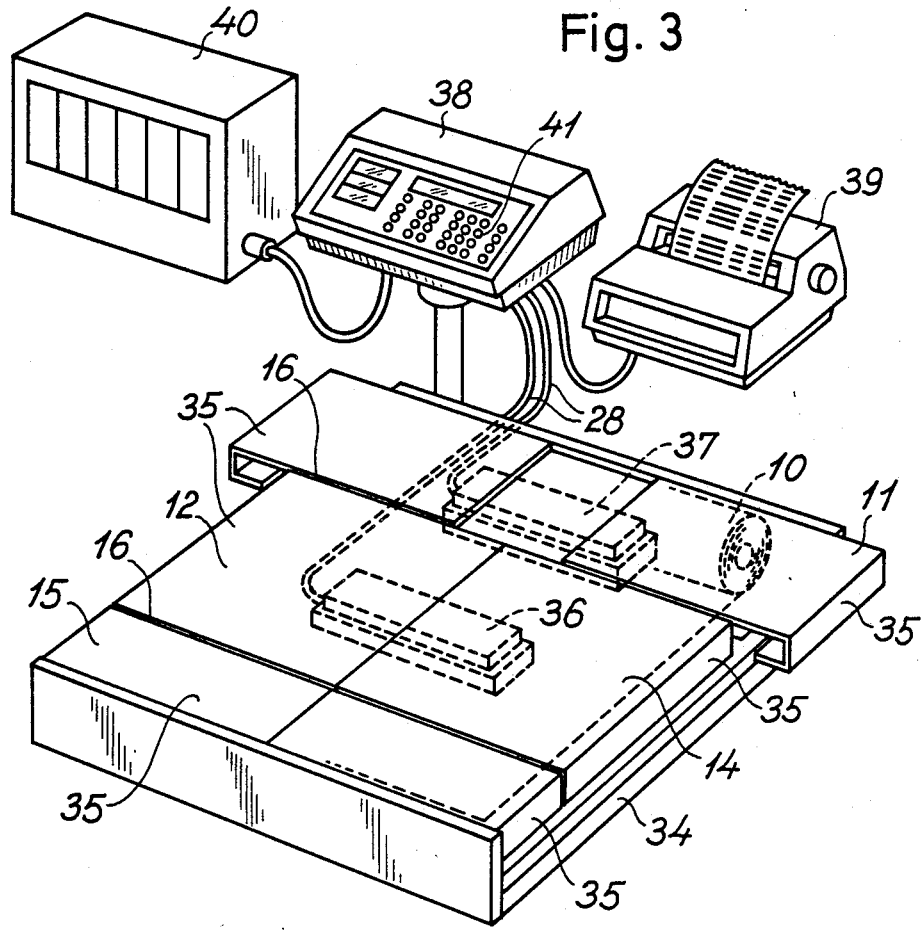
Figure 4:
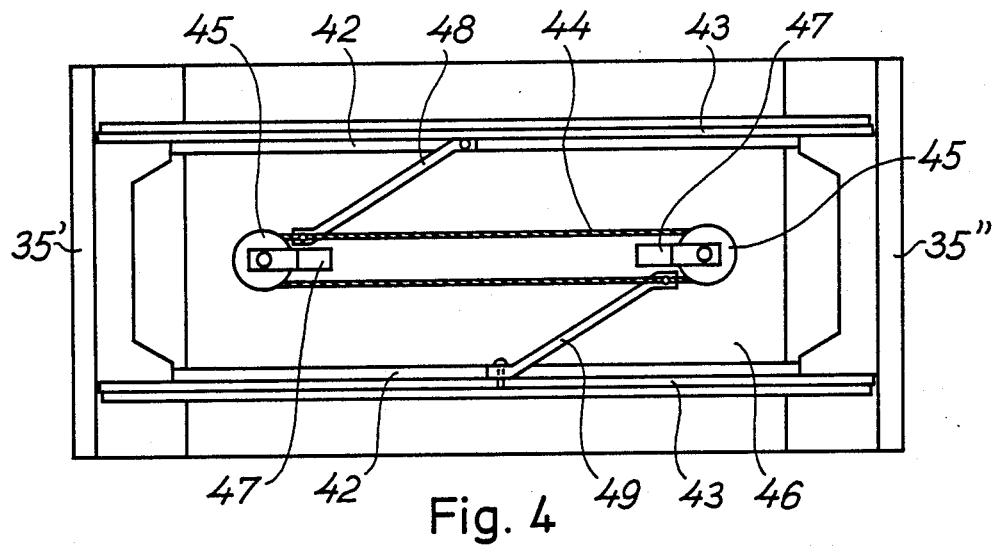

The invention will now be further described with reference to the drawing, wherein FIG. 1 is a diagrammatic illustration of an embodiment of the apparatus according to the invention, FIG. 2 is a perspective view of the apparatus diagrammatically shown in FIG. 1, FIG. 3 is a perspective view of a second embodiment of the apparatus according to the invention, and FIG. 4 is a bottom view of a set of extensible and retractable supporting plates of the apparatus shown in FIG. 3.

The apparatus shown in the drawing is adapted to determine the total length of a roll 10 of textile material or another web material. The roll 10 is positioned on a first end section 11 of a table 12, and a free end portion 13 of the web material is supported by the table and extends from its first end section 11, across a middle section 14 to a second end section 15. The table 12 has a rectangular outline, and the end sections 11 and 15 are separated from the middle section 14 by narrow gaps 16. Each of the first and second end sections 11 and 15 of the table 12 is connected to a flange 17 of a channel-shaped frame body 18. The middle section 14 of the table 12 is supported by a first weighing cell 19 or other weight determining means via a web member 20. The weighing cell 19 is positioned within an upwardly open chamber 21 formed on the frame body 18. A foot member 22 connected to the bottom side of the frame body 18 is supported by a second weighing cell 23 positioned in an upwardly open chamber 24 which is formed on the top side of a base member 25 which may, for example, be supported by casters or rollers 26.

From FIG. 1 it is apparent that the first weighing cell 19 supports not only the middle table section 14 and the web member 20, but also a length of the free end portion 13 of the textile or web material corresponding to the length 1 of the middle section 14. Correspondingly, the second weighing cell 23 supports not only the frame body 18, the web member 20 and the table 12, but also the roll 10 including the free end portion 13. Thus, the first weighing cell 19 may generate a first weighing signal being a measure of the weight w1 of the length 1 of the web material supported by the middle section 14 of the table 12, while the second weighing cell may generate a second weighing signal being a measure of the total weight w2 of the roll 10 including the free end portion 13. These signals are transmitted to an electrical calculating device 27 through conductors 28.

In case the web material of the roll 10 is wound around a core member 29 it is necessary to know or determine the weight wc of the core member. Information about this weight wc of the core member may be transmitted to the calculating device 27 by means of a key board 30. The total length L of the web material of the roll 10 may then be calculated by the calculating device 27 by the following equation:

$$L = \frac{w2 - wc}{w1} \times l$$

and the result may directly be read from a display 31. The calculating device 27 may also comprise an on/off switch 32 and a reset or adjustment button 33.

When the length of a roll of web material is to be determined, the apparatus is switched on by means of the switch 32 and the apparatus is reset or adjusted to zero by depressing the button 33. Thereafter, the roll 10 is placed on the first end section 11 of the table 12 with the free end portion 13 of the web material extending across the table as shown in the drawing. The total length L of the web material may then be directly read from the display 31 of the calculating device 27.

The embodiment shown in FIG. 3 comprises a U-shaped frame member 34 supporting the table 12. As in the embodiment shown in FIG. 2 the table 12 is divided into a first end section 11, a middle section 14 and a second end section 15, and these sections are separated by narrow, parallel extending gaps 16. Each of the sections 11, 14, and 15 are formed by a pair of plate members interengaging in a telescopic manner so as to be extensible and retractable in the direction of the gaps 16. Thus, the width of the table 12 may be adapted to the length of the roll 10 by retracting or extending the plate members 35 arranged on the frame member 34. Similarly, the first table end section 11 on which the roll 10 may be placed is supported by a second weighing cell 37 arranged on the frame member. Thus, the weighing cell 37 may generate a weighing signal indicating the weight of the roll 10 whereas the weighing cell 36 generates weighing signal indicating the weight of the length l of the web material supported by the middle section 14. These signals are transferred to an electronic computing device 38, which may be connected to a printer 39 and a central computer 40. Information about the weight wc of a possible core member of the roll 10 may be transferred to the computing device 38 through the key board 41 thereof. If the weight of the roll 10 including the core member, but excluding the free end portion of the web material supported by the sections 14 and 15, is wr, while the weight of the length l of the web material supported by the middle section is wl, the total length L of the web material of the roll 10 may be calculated by the following equation:

$$L = l\left(\frac{wr - wc}{wl} + 1\right) + \Delta l$$

where $\Delta l$ is an estimated length of the free end of the web material which is supported by the second table end section and thus not being weighed.

FIG. 4 is a bottom view of a pair of telescopically cooperating plate members 35. One of these plate members 35' is connected to a first pair of mutually spaced parallel guide rails 42, and the other plate member 35" is connected to a similar pair of guide rails 43 which are arranged in sliding and guiding contact with the rail 42. An endless wire 44 is passed around a pair of longitudinally spaced pulleys 45 which are rotatably mounted on a mounting plate 46 by means of brackets 47. The mounting plate 46 is fixed to the frame member 34 and the two runs of the endless wire 44 are connected to one of the first guide rails 42 and one of the second guide rails 43 by connecting arms 48 and 49, respectively. It is understood that the arrangement shown in FIG. 4 will transfer an outward or inward movement of any of the plate members 35' and 35" to the other. Thus, if one of the plate members 35 in any of the table sections 11, 14 and 15 is drawn outwardly, the other plate member of the section will move a similar distance outwardly, and if one of the plate members 35 is pushed inwardly, the other opposite plate member will move a similar distance inwardly. Consequently, the width of the table 12 may easily be adjusted to the length of the roll 10 or the width of the wound web material.

It should be understood that various amendments and modifications of the apparatus described above may be made within the scope of the present invention. As an example, the weighing cell 37 in FIG. 3 may support all of the sections 11, 14 and 15, and the weighing cell 36 in a similar manner as described in relation to FIGS. 1 and 2.

We claim:
1. A method of determining the length of a flexible web or string material forming a wound body, said method comprising:
   determining a first measure of the total weight of said wound web or string material,
   determining a second measure of the weight of a predetermined length of a free end portion of the wound web or string material while said predetermined length is connected to the wound body, and
   calculating the total length of the flexible web or string material on the basis of said predetermined length and said first and second weight measure.

2. A method according to claim 1, wherein said wound body comprises a core member around which the web or string material is wound, said first weight measure being determined by determining the total weight of the wound body, estimating the weight of the core member and subtracting the weight of the core member, from the total weight of the wound body.

3. A method according to claim 3, wherein the weight of the core member is estimated by estimating the specific weight of the material and the volume of the core member.

4. A method according to claim 1, wherein said second weight measure is determined by second weighing means supporting said predetermined length, said first weight measure being determined by first weighing means supporting said wound body.

5. A method according to claim 4, wherein said first weighing means also support said second weighing means.

6. A method according to claim 1, wherein said second weight measure is determined by weighing different fractions of said predetermined length separately, and compensating for errors depending on the flexibility of the web or string material on the basis of the relationship of the determined weights of said fractions.

7. An apparatus for determining the length of a flexible web or string material forming a wound body, said apparatus comprising
   first weighing means including a first supporting surface for supporting said wound body and for determining a first weight measure therefor,
   second weighing means including a second supporting surface for supporting a predetermined length of a free end portion of said wound web or string material and for determining a second weight measure of said predetermined length, said first and second supporting surfaces extending substantially horizontally and in substantially the same plane and being separated by a narrow first gap extending transversely to said predetermined length of said free end portion of said wound material
   means for calculating the length of the web or string material on the basis of said first and second weight measures.

8. An apparatus according to claim 7, wherein said first and second weight measures are in the form of first and second electrical signals which are transmitted to said calculating means which are of the electronic type.

9. An apparatus according to claim 7, wherein said second weighing means are supported by said first weighing means.

10. An apparatus according to claim 7, wherein said first and second supporting surfaces are defined on first and second supporting plates respectively, said plates being extensible and retractable in the direction of said gap.

11. An apparatus according to claim 7 and further comprising a third supporting surface which is substantially co-planar with said first and second supporting surfaces, said second and third supporting surfaces being separated by a narrow second gap extending substantially parallel with said first gap.

12. A method of determining the length of a flexible web or string material forming a wound body, said method comprising placing the web or string material on a substantially horizontal supporting surface which is divided into first, second, and third supporting surface sections by a pair of substantially parallel, narrow gaps extending transversely to the web or string material and defining the second supporting surface section therebetween, stretching the web or string material out along the second supporting surface section, determining a first measure of the weight of the web or string material supported by at least one of said first and third supporting surface sections, determining a second measure of the weight of the web or string material supported by said second supporting surface section, and calculating the total length of the flexible web or string material on the basis of the distance between said pair of gaps and said first and second weight measures.

13. A method according to claim 12, wherein said wound body comprises a core member around which the web or string material is wound, said first weight measure being determined by determining the total weight of the wound body, estimating the weight of the core member, and subtracting the estimated weight of the core member from the total weight of the wound body.

14. A method according to claim 13, wherein the weight of the core member is estimated by estimating the specific weight of the material and the volume of the core member.

15. A method according to claim 12, wherein a free end portion of the wound web or string material is stretched out along the second supporting surface section and along adjacent parts of the first and third supporting surface sections.

16. A method according to claim 12, wherein said second weight measure is determined by second weighing means supporting said predetermined length, and said first weight measure being determined by first weighing means supporting said wound body.

17. A method according to claim 12, wherein said second weight measure is determined by weighing different fractions of said predetermined length separately, and compensating for errors depending on the flexibility of the web or string material on the basis of the relationship of the determined weights of said fractions.

* * * * *

UNITED STATES PATENT AND TRADEMARK OFFICE
CERTIFICATE OF CORRECTION

PATENT NO. : 4,912,972

DATED : 3 April 1990

INVENTOR(S) : Johan C. Gregersen, Johan Dovmark

It is certified that error appears in the above-identified patent and that said Letters Patent is hereby corrected as shown below:

Title page, ABSTRACT, line 1, delete "Wherein"; and in
line 17 "weighting" should be --weighing--

Col. 1, line 33 "fist" should be --first--

Col. 2, line 21, "form" should be --from--

Col. 2, line 54, "weight" should be --weighing--

Col. 2, line 61, "th" should be --the--

Col. 2, line 62, "ewound" should be --wound--

Col. 5, line 19, after "35" insert --as described in more detail below. The middle table section 14 on which the free end portion 13 of the web material is placed and supported by a first weighing cell 36--

Col. 5, line 24, "weighting" should be --weighing--

Col. 6, line 31, "3" should be --2--

Signed and Sealed this

Ninth Day of July, 1991

Attest:

HARRY F. MANBECK, JR.

Attesting Officer

Commissioner of Patents and Trademarks